(12) United States Patent
Hamada (10) Patent No.: US 8,213,061 B2
(45) Date of Patent: Jul. 3, 2012

(54) DETECTION DEVICE, IMAGE READING CONTROL DEVICE, AND RECORDING MEDIUM IN WHICH IS RECORDED AN ERROR CORRECTION PROGRAM OF A DETECTION DEVICE

(75) Inventor: Eiji Hamada, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 639 days.

(21) Appl. No.: 12/422,707

(22) Filed: Apr. 13, 2009

(65) Prior Publication Data

US 2010/0033768 A1 Feb. 11, 2010

(30) Foreign Application Priority Data

Aug. 7, 2008 (JP) ................................ 2008-204363

(51) Int. Cl.
*H04N 1/04* (2006.01)
*H04N 1/46* (2006.01)
*G06K 9/32* (2006.01)

(52) U.S. Cl. ........ 358/482; 358/474; 358/483; 358/443; 358/448; 358/450; 358/465; 358/505; 358/514; 358/525; 382/300; 382/312

(58) Field of Classification Search .................. 358/482, 358/483, 443, 448, 450, 46, 512, 513, 514, 358/525, 474, 505; 382/312, 300
See application file for complete search history.

(56) References Cited

U.S. PATENT DOCUMENTS

| | | | | |
|---|---|---|---|---|
| 5,315,412 A | * | 5/1994 | Mihara et al. | 358/512 |
| 5,587,814 A | * | 12/1996 | Mihara et al. | 358/512 |
| 7,123,388 B2 | * | 10/2006 | Ichihashi | 358/483 |
| 7,164,509 B2 | * | 1/2007 | Machida | 358/482 |
| 2009/0074330 A1 | * | 3/2009 | Hamada et al. | 382/321 |
| 2010/0183237 A1 | * | 7/2010 | Yamanaka | 382/260 |
| 2011/0038018 A1 | * | 2/2011 | Kurigata | 358/474 |

FOREIGN PATENT DOCUMENTS

JP 2006-079318 A 3/2006
* cited by examiner

*Primary Examiner* — Cheukfan Lee
(74) *Attorney, Agent, or Firm* — Sughrue Mion, PLLC (57) ABSTRACT

A detection device that includes a setting component, a measuring component, an accumulating component, a determining component, and an increasing/decreasing component is provided. The joint quantity measuring component measures joint quantities between the photoelectric conversion elements that are dependent on precision when arraying the plural photoelectric conversion elements. The joint error quantity accumulating component accumulates error quantities of the joints that are obtained from the joint quantities that have been measured and a reference quantity. The determining component determines whether or not the accumulated error quantity has exceeded an allowable range. The interpolation pixel increasing/decreasing component increases/decreases, on the basis of direction of error, interpolation pixels between specific photoelectric conversion elements when it has been determined that the accumulated error quantity has exceeded the allowable range.

15 Claims, 9 Drawing Sheets

| DETERMINATION BLOCK | (1) | (2) | (3) | (4) | (5) | (6) | MAXIMUM ERROR WITHIN DETERMINATION BLOCK | | | DETERMINATION BLOCK | (11) | (12) | (13) | (14) | (15) | MAXIMUM ERROR WITHIN DETERMINATION BLOCK |
|---|---|---|---|---|---|---|---|---|---|---|---|---|---|---|---|---|
| INTER-CHIP SPACE No. | (1) | (2) | (3) | (4) | (5) | (6) | | | | | (11) | (12) | (13) | (14) | (15) | |
| ERROR ΔL'(n) μm | +11 | (+15) | +10 | +13 | +11 | 0 | | | | | -13 | (-15) | -14 | -12 | -6 | |
| ACCUMULATED ERROR ΔL μm | +11 | +26 | +36 | (+49)→+7 | +18 | +18 | | | | | -13 | -28 | (-42)→0 | -12 | -18 | |
| INCREASE/DECREASE OF INTERPOLATION PIXELS |  | +1 |  |  |  |  | | | | |  | -1 |  |  | ** | | g=42 μm

DETECTION DEVICE, IMAGE READING CONTROL DEVICE, AND RECORDING MEDIUM IN WHICH IS RECORDED AN ERROR CORRECTION PROGRAM OF A DETECTION DEVICE

CROSS-REFERENCE TO RELATED APPLICATION

This application is based on and claims priority under 35 USC 119 from Japanese Patent Application No. 2008-204363 filed Aug. 7, 2008.

BACKGROUND

1. Technical Field

The present invention relates to a detection device, an image reading control device, and a recording medium in which is recorded an error correction program of a detection device.

2. Related Art

In a photoelectric conversion element group (below, called a "line sensor module") that is disposed with photoelectric conversion elements (below, called "chips") where plural photoelectric conversion pixels (below, simply called "pixels") are arrayed at least in one direction and which has a predetermined reading width as a result of plural chips being arrayed in the one direction, assembly error arises in gaps between the chips.

In view of the cutting margin of the chips and mounting technology capability under current conditions, it is physically close to impossible to make the pixel pitch across the chips the same distance as the pixel pitch inside the chips.

It will be noted that, when the chips are arrayed in one row and assembled, a certain degree of assembly error arises, and it is common to dispose an allowable error beforehand. It is easy to keep the gaps between the chips within the range of this allowable error.

SUMMARY

According to an aspect of the invention, there is provided a detection device. The detection device includes: a setting component that, in a photoelectric conversion element group that is intended for photoelectric conversion elements where plural photoelectric conversion pixels are arrayed at least in one direction and that has a predetermined reading width as a result of plural photoelectric conversion elements being arrayed in the one direction, sets, as an initial setting and in joints between the photoelectric conversion elements, interpolation pixels that are interpolated by reading information that surrounding photoelectric conversion pixels have read; a measuring component that measures joint quantities between the photoelectric conversion elements that are dependent on precision when arraying the plural photoelectric conversion elements; an accumulating component that accumulates error quantities of the joints that are obtained from the joint quantities that have been measured by the joint quantity measuring component and a reference quantity; a determining component that determines whether or not the accumulated error quantity in the joint error quantity accumulating component has exceeded an allowable range; and an increasing/decreasing component that increases/decreases, on the basis of direction of error, interpolation pixels between specific photoelectric conversion elements when it has been determined by the determining component that the accumulated error quantity in the joint error quantity accumulating component has exceeded the allowable range.

BRIEF DESCRIPTION OF THE DRAWINGS

An exemplary embodiment of the present invention will be described in detail based on the following figures, wherein.

DETAILED DESCRIPTION

Figure 1:
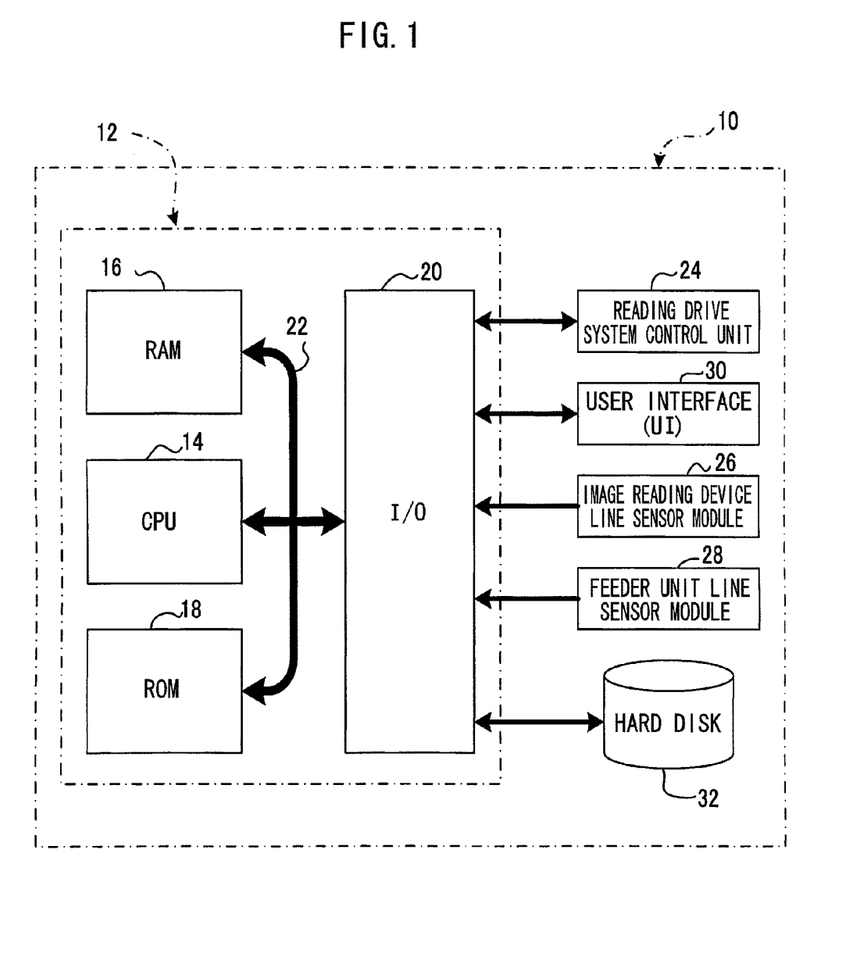
FIG. 1 is a general diagram of a reading controller that is a control device of an image reading device pertaining to the exemplary embodiment of the present invention.

In FIG. 1, there is shown a general diagram of a reading controller 10 that is a control device of an image reading device pertaining to an exemplary embodiment of the present invention.

The reading controller 10 is disposed with a main control unit 12 that generally manages and controls processing related to image reading.

The main control unit 12 includes a CPU 14, a RAM 16, a ROM 18, an I/O (input/output unit) 20 and a bus 22 such as a data bus or a control bus that interconnects these.

A reading drive system control unit 24 is connected to the I/O 20. The reading drive system control unit 24 controls a drive system of a feeder unit when reading, while conveying, a document and a drive system such as an optical system moving unit for reading an image of a document that has been placed and positioned on a document platen. It will be noted that a document that has been positioned on the document platen is scanned by this optical system moving unit, whereby that scanning light is guided to an image reading device line sensor module 26. In this case, a condensing lens is disposed in the optical system moving unit such that a main scanning direction of an image that has been read is condensed and read by the image reading device line sensor module 26.

The CPU 14 reads various types of programs for performing reading control that are stored in the ROM 18 and performs execution of later-described processing. It will be noted that it is also possible to store and provide these programs in a portable storage medium such as a CD-ROM or the like.

The image reading device line sensor module 26 and a feeder unit line sensor module 28, which is attached to the feeder unit, are connected to the I/O 20.

The difference between the feeder unit line sensor module 28 and the image reading device line sensor module 26 is that, whereas the feeder unit line sensor module 28 corresponds to the reading width of a document, the image reading device line sensor module 26 is reduced by a predetermined magnification ratio with respect to the reading width of a document. In the exemplary embodiment of the present invention, hereinafter, when there is no particular description, this will indicate the feeder unit line sensor module 28 (below, simply called "the line sensor module 28").

Further, a UI (user interface) 30 is connected to the I/O 20. The UI 30 has the role of receiving input instructions from a user and informing the user of information related to image processing.

Moreover, a hard disk 32 is connected to the I/O 20. The hard disk 32 has the role of storing image data that have been read, for example.

Figure 2:
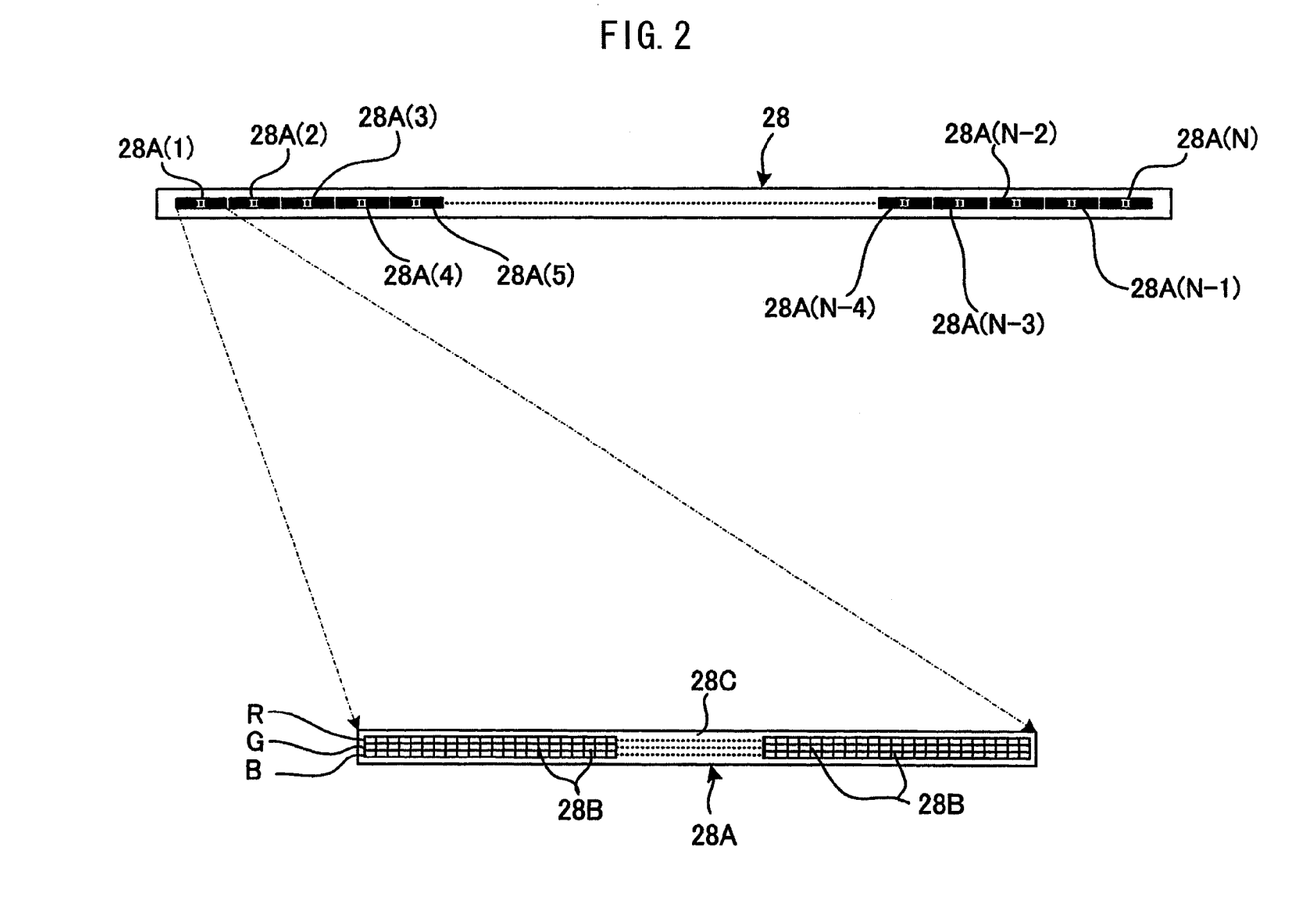
FIG. 2 is a front diagram showing the configuration of a line sensor module.

As shown in FIG. 2, in the exemplary embodiment of the present invention, the line sensor module 28 is disposed with N (N is a positive integer) number of sensor chips 28A(1), 28A(2) to 28A(N) (below, these will be called "the sensor chips 28A" when it is not particularly necessary to specify any of these or when these are generically referred to). These plural sensor chips 28A are linearly arrayed in one row.

Figure 3:
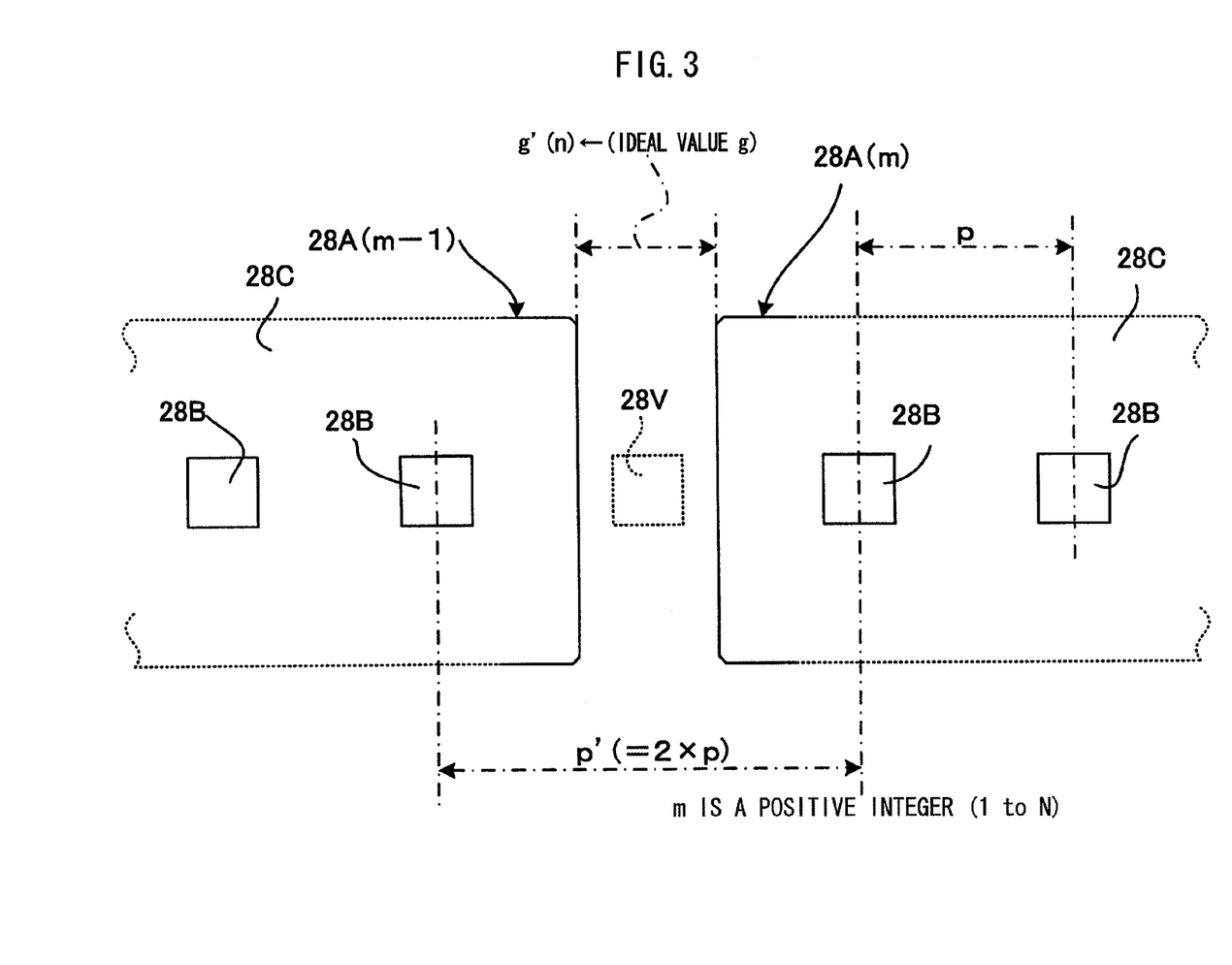
FIG. 3 is an enlarged diagram of a space between sensor chips.

Each of the sensor chips 28A is configured such that its sensor surface (light-receiving surface) has a long and narrow rectangular shape whose longitudinal direction is in the array direction and such that G (G is a positive integer) number of pixels (photoelectric conversion pixels) 28B are arrayed at a predetermined pixel pitch p (see FIG. 3). It will be noted that the line sensor module 28 of the exemplary embodiment of the present invention has a configuration where three pixels of the respective colors of RGB are disposed in a vertical direction (a sub-scanning direction)—or in other words, a configuration where there is one line for each color for a total of three lines—in order to read the concentration for each of the colors of RGB. Below, three pixels of the respective colors will be described as one unit pixel to configure a one-line sensor chip 28A.

In each of the sensor chips 28A, a casing 28C is disposed so as to surround the pixels 28B.

As shown in FIG. 3, when the sensor chips 28A are adjacently arrayed, a pitch p' between a pixel 28B on an end portion (e.g., the right end portion) of one sensor chip 28A (m−1) (m is a positive integer and any of 1 to N) and a pixel 28B on an end portion (e.g., the left end portion) of another sensor chip 28A(m) does not become equal to the pixel pitch p inside one of the sensor chips 28A. A physically adverse effect (the presence of the casing 28C) is the cause of this.

Thus, in the exemplary embodiment of the present invention, a gap g' (whose ideal value is g) is disposed between the sensor chips 28A, the pixel pitch p' across the two sensor chips 28A is made equal to two times the pixel pitch p inside one of the sensor chips 28A (p'=2×p), and a hypothetical pixel (interpolation pixel) 28V is embedded between the two sensor chips 28A. As a result, in the data row that has been read by the line sensor module 28, one interpolation pixel 28V each becomes disposed between the sensor chips 28A (initial setting).

As a result, the data row can become data that are always read at the equal pitch p in terms of appearance both inside one of the sensor chips 28A and across two of the sensor chips 28A.

Specific numerical values of elements for specifying the line sensor module 28 that is applied to the exemplary embodiment of the present invention, including the variable N and p, are indicated below.

Number-of-sensor-chips N: 32
Number-of-pixels G in sensor chip unit: 228

Pitch dimension p of each pixel 28B inside sensor chip: 42.33 μm

Gap g (ideal value) between sensor chips: 42 μm

It will be noted that, in the exemplary embodiment of the present invention, the gap g (ideal value) is different from the pixel pitch p' and is a gap between the outlines of the sensor chips 28A, but the gap g may also be the same as the pixel pitch p'.

Figure 4:
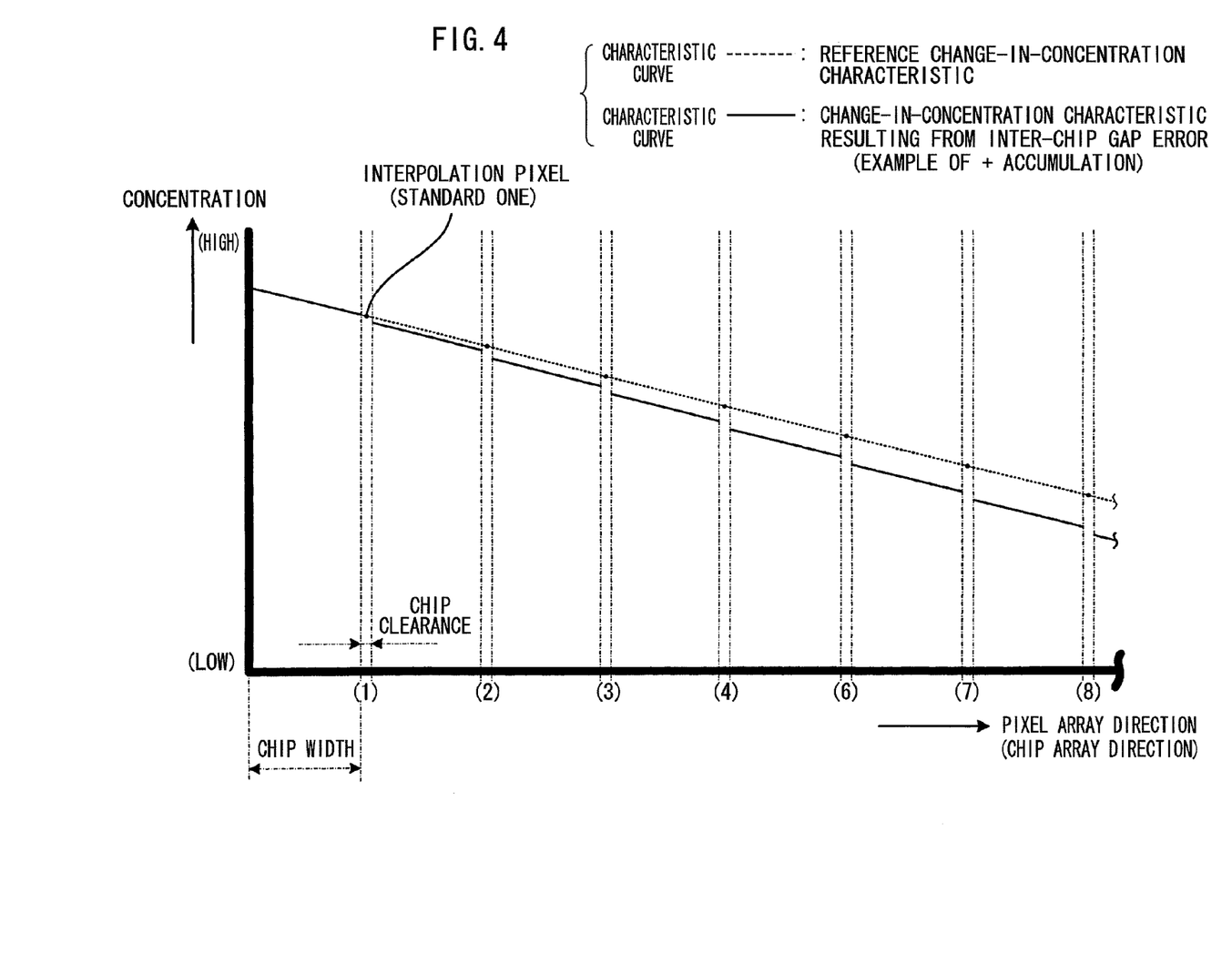
FIG. 4 is a concentration characteristic diagram of a reference image that has been read using the line sensor module.

Incidentally, in the sensor module 28 of the above-described configuration, when the sensor chips 28A are arrayed with theoretical precision and the concentration of a reference concentration pitch (a pattern image whose concentration changes in direct proportion along the main scanning direction (a reading direction resulting from the sensor module 28)) is read, as indicated by the chain line in FIG. 4, a linear characteristic diagram is obtained across the interpolation pixels 28V.

Incidentally, in assembling the sensor chips 28A, assembly error arises because of physical factors. Thus, an allowable error is disposed in the gaps between the sensor chips 28A. This allowable error is configured to be ±15 μm with respect to the gap g (ideal value) on the basis of the specific numerical values. Setting of this allowable error is dependent on the reading resolution of the line sensor module 28 that is to be mounted, but in the exemplary embodiment of the present invention, it is configured to be in a range where there are no problems in terms of precision as long as it is in the above-described range of allowable error.

Here, in relation to assembling the sensor chips 28A in the above-described range of allowable error, there are no problems; however, for example, as for error tendency, the potential for errors to become concentrated in the same direction (plus or minus) when assembling one of the sensor modules 28 is high.

Figure 5A:
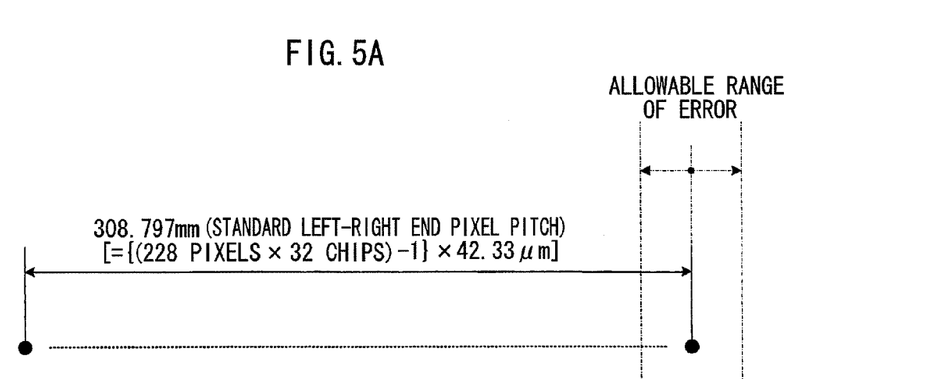
FIG. 5A to FIG. 5C are general diagrams showing error resulting from accumulation of inter-sensor chip gap errors of the line sensor module.
Figure 5B:
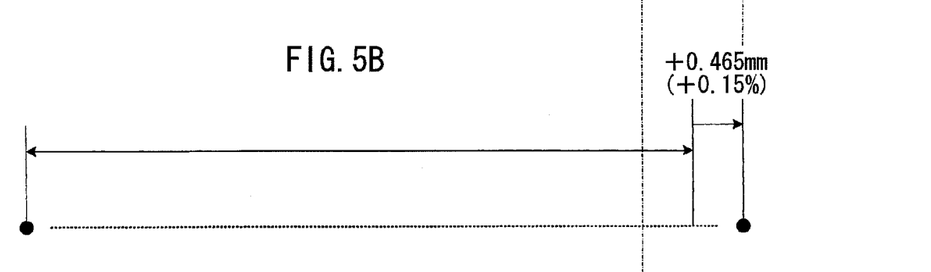
Figure 5C:
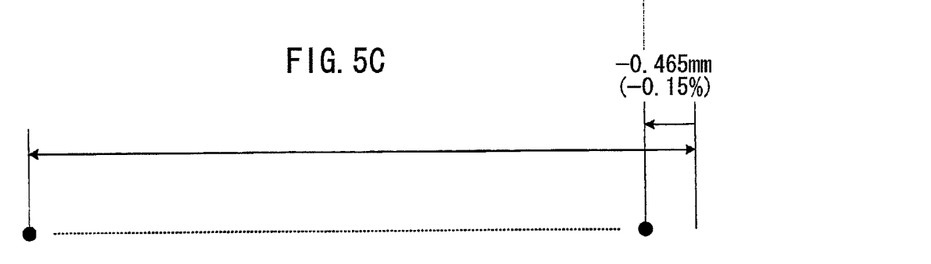

For this reason, errors gradually become accumulated from one end (e.g., the left end, which is where reading starts, when seen in planar view) of the sensor module 28 whose assembly has been completed. This accumulation of errors affects the reading width of the sensor module 28, and the length (the length to the other end (e.g., the right end, which is the terminal end of reading, when seen in planar view) with the one end serving as a reference) of the sensor module 28 under the above-described specific numerical values becomes ±0.465 mm and even reaches about ±0.15% of the total length that becomes a reference (see FIG. 5A to FIG. 5C).

Thus, in the exemplary embodiment of the present invention, errors (errors corresponding to one pitch of the pixels) are offset by measuring the gaps g'(n) between the sensor chips 28A in order from the left end of the sensor module 28, accumulating errors ΔL'(n) of the gaps (accumulated value ΔL(n)), and increasing/decreasing the interpolation pixels 28V at a point in time when this accumulated value (absolute value) |ΔL(n)| exceeds the ideal value g of the gaps.

Further, this increase/decrease processing control of the interpolation pixels 28V is repeated and executed until the right end (terminal end) of the sensor module 28 such that, at each time of that increase/decrease processing, errors corresponding to one pitch of the pixels are offset.

g'(n): actual measured values of gaps between sensor chips 28A

ΔL'(n): errors of gaps between sensor chips 28A→ΔL'(n)=g'(n)−g

ΔL: accumulated value of gaps ΔL'(n) between sensor chips 28A→ΔL=ΔL+ΔL'

Here, n represents gap numbers that are the same as the numbers of the sensor chips 28A and are ordinarily 1, 2 to N−1 from the left end.

As for actual measurement of the gaps g', for example, a reference image whose concentration gradually continuously changes along the reading width direction is read using the sensor module 28, and the data that have been read are analyzed. If the pixel pitch dimension p is constant, then it has a continuous change-in-concentration data change characteristic following the reference image, but joint portions between the sensor chips 28A are different from the pixel pitch p' because of gap errors, so they should become discontinuous data (step data) deviant from the reference image. By extracting the discontinuous data, the gaps g' are obtained.

Figure 6:
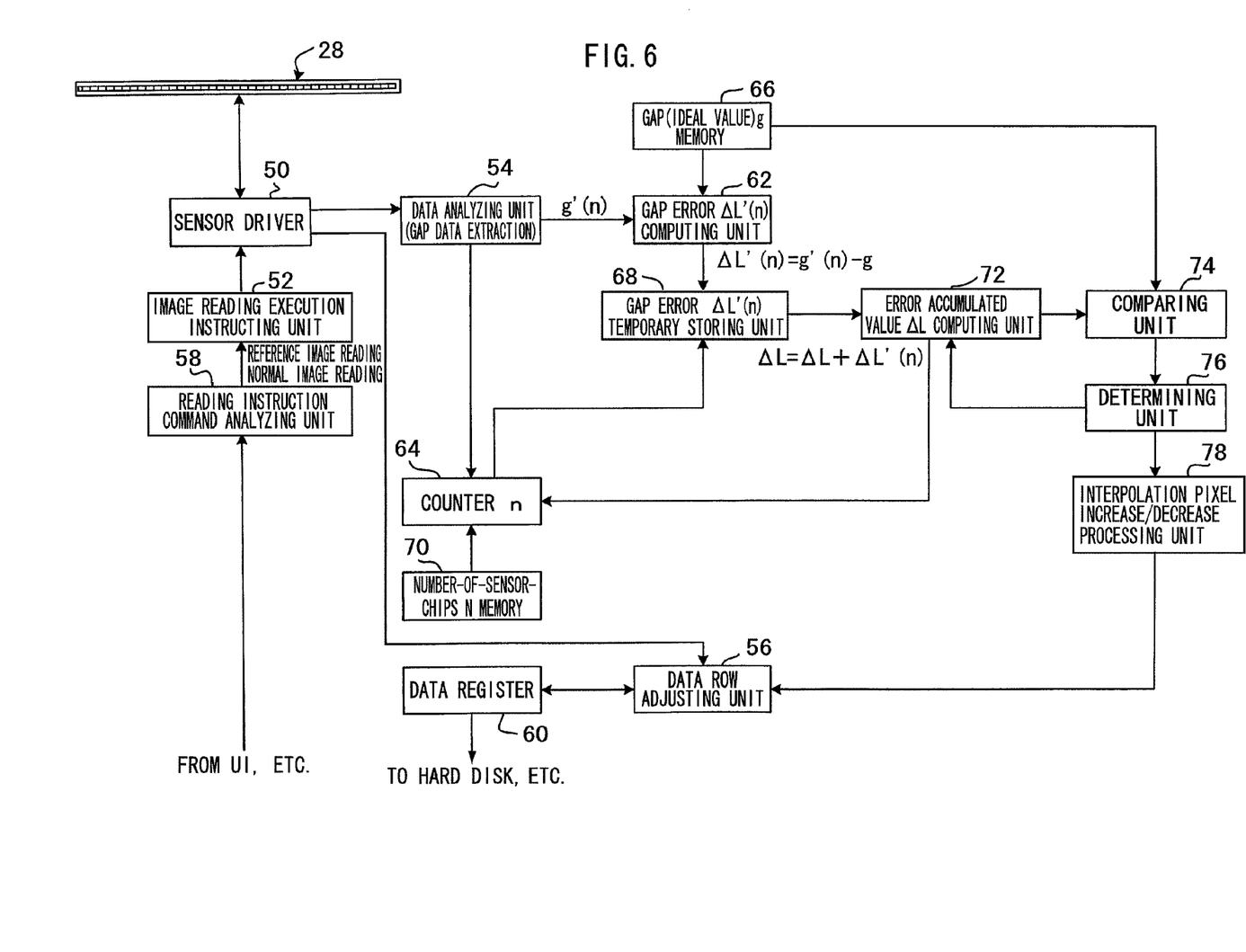
FIG. 6 is a block diagram functionally showing interpolation pixel increase/decrease control that is implemented by a main control unit pertaining to the exemplary embodiment of the present invention.

FIG. 6 is a block diagram functionally showing a control system which, in the main control unit 12 shown in FIG. 1, executes processing from actual measurement of the gaps g' to increasing/decreasing the interpolation pixels. It will be noted that this block diagram is one where just characteristic portions of the exemplary embodiment of the present invention are extracted and functionally shown and is not intended to limit the hardware configuration.

The sensor module 28 is connected to a sensor driver 50, and reading is executed by an instruction from this sensor driver 50.

The sensor driver 50 is connected to an image reading execution instructing unit 52, a data analyzing unit 54 and an interpolation processing unit 56.

The image reading execution instructing unit 52 outputs an execution instruction command to the sensor driver 50 on the basis of a reading instruction from a reading instruction command analyzing unit 58. Among the commands inputted to the reading instruction command analyzing unit 58, there are a reference image reading instruction and a normal image reading instruction, and when there is the reference image reading instruction, the aforementioned interpolation pixel increase/decrease control is executed. In this case, as a document, the line sensor module 28 reads a reference document with a concentration characteristic such as indicated by the chain line in FIG. 4.

It will be noted that the normal image reading instruction is an instruction during the work of reading a document image by normal operation, and in this case, image data that have been read by the line sensor module 28 are sent to a data register 60 via the interpolation processing unit 56. The data register 60 has the role of temporarily storing image data and, as needed, transferring image data to the hard disk 32 and the like.

Image data (reference image data) in the case where the line sensor module 28 has read a reference image document based on the reference image reading instruction are sent to the data analyzing unit 54.

The data analyzing unit 54 extracts the gap data g'(n) on the basis of the reference image data that have been inputted.

The data analyzing unit 54 is connected to a gap error computing unit 62 and a counter 64.

The gap data g'(n) that have been extracted by the data analyzing unit 54 are sent to the gap error computing unit 62. The gap error computing unit 62 is connected to a gap (ideal value) memory 66, and the gaps (ideal value) g are inputted. Thus, in the gap error computing unit 62, the gap errors $\Delta L'(n)$ are computed ($\Delta L'(n) = g'(n) - g$).

The gap errors $\Delta L'(n)$ that have been computed are temporarily stored in a gap error temporary storing unit 68. It will be noted that the value of n at this time corresponds to the number of gap data that have been extracted by the data analyzing unit 54, and n is 1 to (N−1).

Further, when reference image data are inputted to the data analyzing unit 54, the data analyzing unit 54 causes the counter 64 to start up.

The number-of-sensor-chips N is inputted to this counter 64 from a number-of-sensor-chips memory 70, and the counter 64 has the role of incrementing the count value n (n is 1 to N−1) in response to a later-described input trigger signal (a trigger signal from an error accumulated value computing unit 72) and sending this n value to the gap error temporary storing unit 68.

The gap errors $\Delta L'(n)$ that have been stored in the gap error temporary storing unit 68 are sent to the error accumulated value computing unit 72 in response to a signal from the counter 64.

The error accumulated value computing unit 72 accumulates the errors ($\Delta L = \Delta L + \Delta L'(n)$) and sends the result to a comparing unit 74. It will be noted that the error accumulated value computing unit 72 sends a trigger signal to the counter 64 each time the error accumulated value computing unit 72 accumulates.

The comparing unit 74 is connected to the gap (ideal value) memory 66 and compares the error accumulated value $\Delta L$ and the ideal value g inputted from this gap (ideal value) memory 66. The comparing unit 74 sends a comparison result of either $\Delta L < g$ or $\Delta L \geq g$ to a determining unit 76.

The determining unit 76 is connected to an interpolation pixel increase/decrease processing unit 78, and interpolation pixel increase/decrease processing is executed on the basis of the determination result (including not increasing/decreasing).

Further, the determining unit 76 is connected to the error accumulated value computing unit 72. The determining unit 76 outputs an instruction signal for adding or subtracting, by a quantity corresponding to interpolation (that is, by a quantity corresponding to one pixel pitch), the error accumulated value $\Delta L$ with respect to the error accumulated value computing unit 72 when there is an increase/decrease in the interpolation pixels resulting from the determination result.

The interpolation pixel increase/decrease processing unit 78 is connected to the interpolation processing unit 56. The interpolation processing unit 56 is connected to the data register 60 and generates, and sends to the data register 60, image data of an interpolation image that has been increased/decreased with respect to the image data that the line sensor module 28 has read under the normal image reading instruction inputted to the interpolation processing unit 56 from the sensor driver 50.

The action of the exemplary embodiment of the present invention will be described below in accordance with the flowchart of FIG. 7A and FIG. 7B.

Figure 7A:
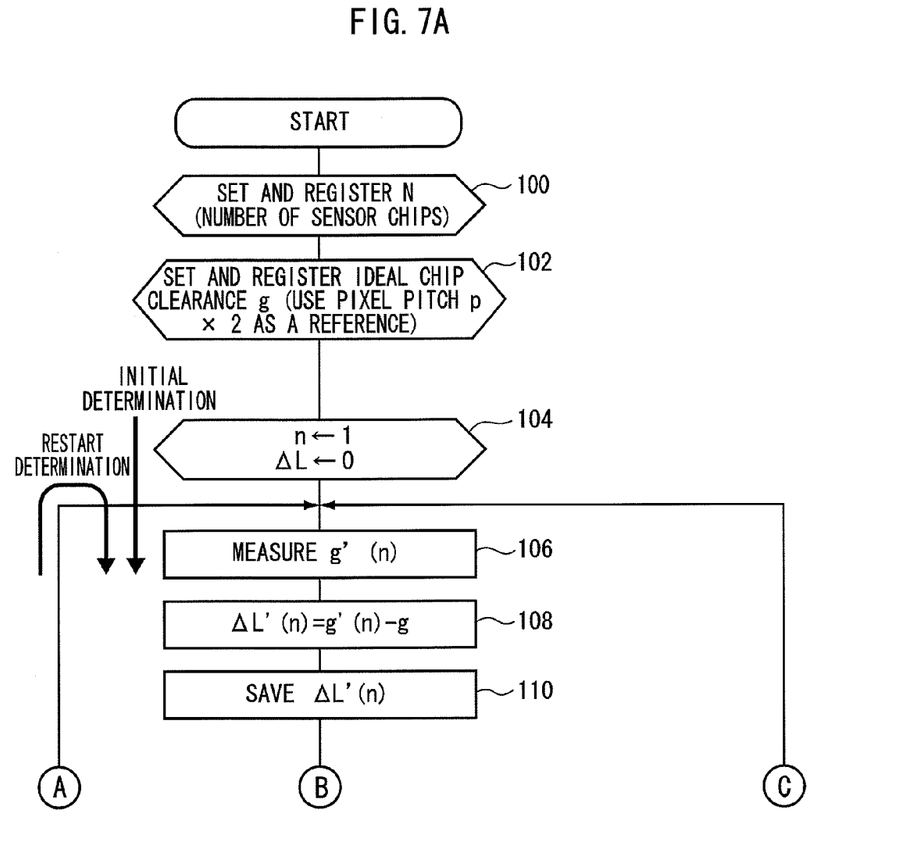
FIG. 7A and FIG. 7B are a flowchart showing an interpolation pixel increase/decrease control routine.
Figure 7B:
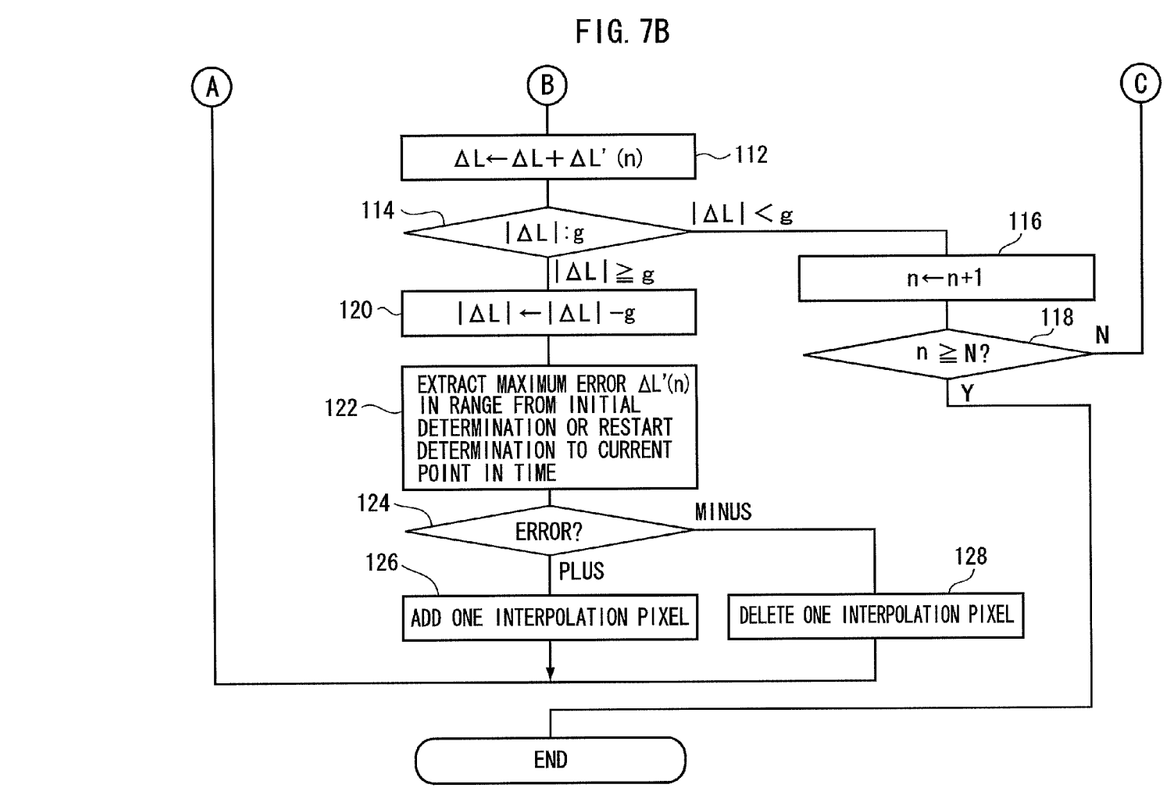

FIG. 7A and FIG. 7B show the flow of an interpolation pixel increase/decrease control routine that is executed by the above-described control system. In step 100, the control routine sets and registers the number-of-sensor-chips N, next moves to step 102, and performs setting and registration of the ideal chip gap g. The control routine sets this ideal chip gap g using the pixel pitch p×2 as a reference.

In the next step 104, the control routine respectively sets the variable n and $\Delta L$ to initial values (the control routine sets the variable n to 1 and sets $\Delta L$ to 0) and then moves to step 106.

In step 106, the control routine measures the gap data g', then moves to step 108, computes the gap errors $\Delta L'(n)$, then moves to the next step 110, saves this computation result, and then moves to step 112.

In step 112, the control routine accumulates ($\Delta L$) the saved gap errors $\Delta L'(n)$, next moves to step 114, and compares the absolute value of the accumulated gap error $\Delta L$ and the ideal chip gap g.

In step 114, when it is determined that |ΔL|<g, then the control routine judges that there is no error of an extent leading to increase/decrease of the interpolation pixels, moves to step 116, increments the variable n, and moves to step 118. In step 118, it is judged whether or not the variable n that has been incremented has become equal to N (that is, whether or not the variable n has exceeded a number of gaps one less than the number-of-sensor-chips N). When it is determined that the answer is NO, then the control routine judges that gaps still remain, returns to step 106, and repeats the above-described process.

Further, in step 118, when the determination is positive, then the control routine judges that measuring and determination of all gaps have ended, and this routine ends.

On the other hand, in step 114, when it is determined that |ΔL|≧g, then the control routine moves to step 120, subtracts the ideal gap g from the current accumulated error, and moves to step 122.

In step 122, the control routine extracts a gap that has a maximum error (where the error ΔL' is a maximum value) in a range from initial determination or restart determination to until the current point in time.

In the next step 124, the control routine judges whether the extracted error ΔL'(n) is plus or minus. When the extracted error ΔL'(n) is plus, then the control routine moves to step 126 and adds one interpolation pixel. When the extracted error ΔL'(n) is minus, then the control routine moves to step 128 and deletes one interpolation pixel. After either step 126 or step 128, the control routine returns to step 106 (re-determination).

It will be noted that, in the exemplary embodiment of the present invention, although the joint quantities have been described as being the dimensions of the gaps between the sensor chips, the joints are not limited to the gaps between the sensor chips and may also be the pixel pitch of end portions of adjacent sensor chips. Further, in a broad sense, it is also not necessary to limit the joints to end portions, and the joints may also be distances between any pixels of adjacent sensor chips.

EXAMPLES

Figure 8A:
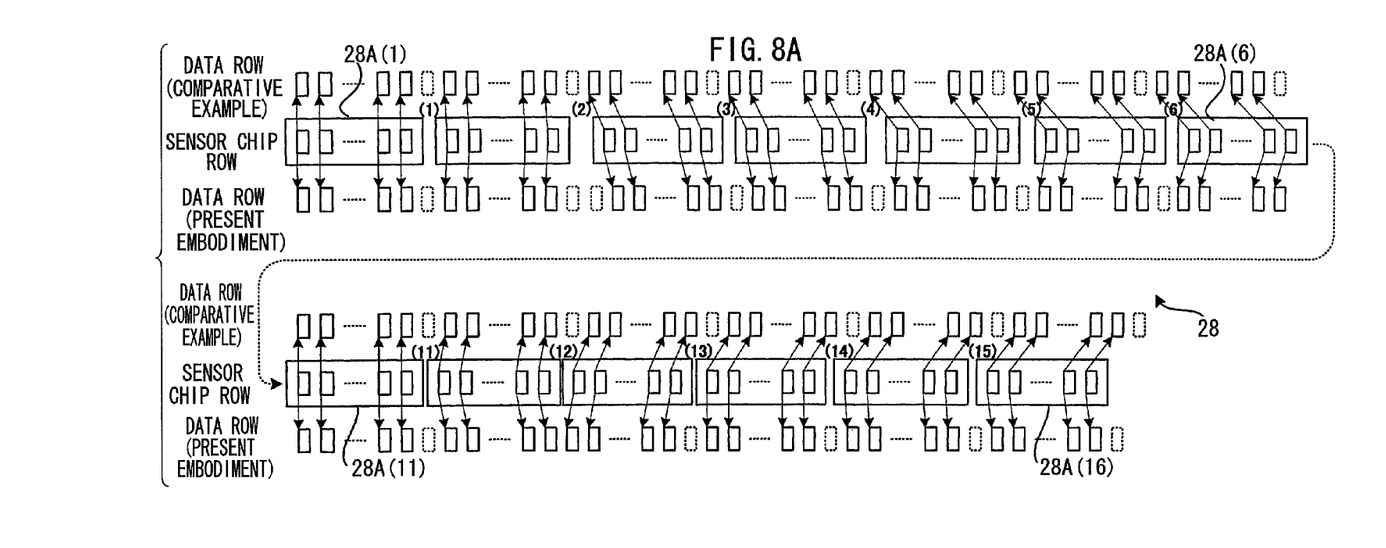
FIG. 8A is a front diagram showing a pixel arrangement relationship in a sensor module pertaining to an example of interpolation pixel increase/decrease control using the exemplary embodiment of the present invention.

FIG. 8A shows, together with a comparative example with respect to the exemplary embodiment of the present invention, the relationship between one example of an array state of the sensor chips pertaining to the exemplary embodiment of the present invention and a data row resulting from that array state.

It will be noted that the comparative example is an example of a case that does not have the characteristics pertaining to the exemplary embodiment of the present invention. That is, in the comparative example, the initial setting of the data row is always maintained. The data row of the initial setting is a data row where one each of the interpolation pixels 28V is disposed between the sensor chips 28A.

On the other hand, in contrast to this comparative example, the data row of the exemplary embodiment of the present invention is configured such that the interpolation pixels are appropriately increased/decreased on the basis of error quantities of the gaps between the sensor chips 28A.

That is, in the initial setting, in the same manner as the data row of the comparative example, one each of the interpolation pixels 28V is set between the sensor chips 28A.

(Example of Accumulation of Plus Errors)

Figure 8B:
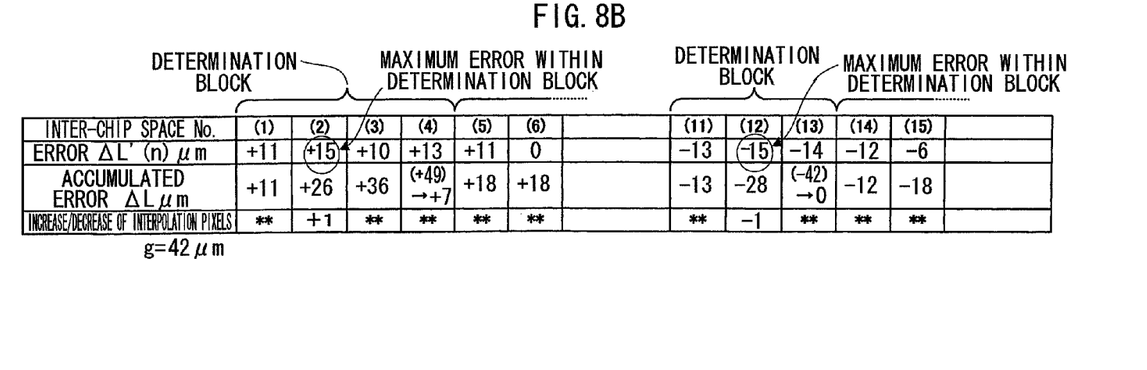
FIG. 8B is a chart showing error data for interpolation of FIG. 8A.

In accordance with the chart in FIG. 8B, when looking at the errors ΔL'(n) when the gaps g'(n) have been measured in order from the left end (the end where reading starts) of the sensor module 28, the error of inter-sensor chip 28A space (1) is +11 μm, the error of inter-sensor chip 28A space (2) is +15 μm, the error of inter-sensor chip 28A space (3) is +10 μm, and the error of inter-sensor chip 28A space (4) is +13 μm. The accumulated error ΔL of these inter-sensor chip 28A spaces (1) to (4) is +49 μm and exceeds 42 μm, which is the gap g (ideal value).

Thus, using these inter-sensor chip 28A spaces (1) to (4) as a determination block, the place with the largest error (here, the inter-sensor chip 28A space (2)) of the gaps belonging within this determination block is extracted, and one interpolation pixel 28V is added because the error is plus error (see FIG. 8A).

(Example of Accumulation of Minus Error)

In accordance with the chart in FIG. 8B, when looking at the errors ΔL'(n) when the gaps g'(n) have been measured in order from the left end (the end where reading starts) of the sensor module 28, the error of inter-sensor chip 28A space (11) is −13 μm, the error of inter-sensor chip 28A space (12) is −15 μm, and the error of inter-sensor chip 28A space (13) is −14 μm. The accumulated error ΔL of these inter-sensor chip 28A spaces (11) to (13) is −42 μm and exceeds 42 μm, which is the gap g (ideal value).

Thus, using these inter-sensor chip 28A spaces (11) to (13) as a determination block, the place with the largest error (here, the inter-sensor chip 28A space (12)) of the gaps belonging within this determination block is extracted, and one interpolation pixel 28V is deleted because the error is minus error (see FIG. 8A).

(Design According to Interpolation Pixel Increase/Decrease)

In the comparative example of FIG. 8A, it will be understood that the errors of the gaps are gradually accumulated and that the corresponding arrows between the positions of the pixels of the sensor chips 28A and the data row gradually become slanted and deviate a considerable amount from the actual reading width.

In contrast, in the exemplary embodiment of the present invention, it will be understood that, even if the errors of the gaps are gradually accumulated, errors corresponding to that quantity are offset by executing increase/decrease of the interpolation pixels 28V as mentioned above, and slanting of the corresponding arrows between the positions of the pixels of the sensor chips 28A and the data row is limited and does not deviate from the actual reading width beyond that limitation.

What is claimed is:

1. A detection device comprising:
   a setting component that, in a photoelectric conversion element group that is intended for photoelectric conversion elements where plural photoelectric conversion pixels are arrayed at least in one direction and that has a predetermined reading width as a result of plural photoelectric conversion elements being arrayed in the one direction, sets, as an initial setting and in joints between the photoelectric conversion elements, interpolation pixels that are interpolated by reading information that surrounding photoelectric conversion pixels have read;
   a measuring component that measures joint quantities between the photoelectric conversion elements that are dependent on precision when arraying the plural photoelectric conversion elements;
   an accumulating component that accumulates error quantities of the joints that are obtained from the joint quantities that have been measured by the joint quantity measuring component and a reference quantity;

a determining component that determines whether or not the accumulated error quantity in the joint error quantity accumulating component has exceeded an allowable range; and an increasing/decreasing component that increases/decreases, on the basis of a direction of error, interpolation pixels between specific photoelectric conversion elements when it has been determined by the determining component that the accumulated error quantity in the joint error quantity accumulating component has exceeded the allowable range.

2. The detection device of claim 1, wherein the joint quantity measuring component measures the joint quantities between the photoelectric conversion elements on the basis of a difference between reading information of reference images that photoelectric conversion elements adjacent to each other on either sides of the joints have read.

3. The detection device of claim 1, wherein the interpolation pixel initial setting component sets, as the initial setting, one interpolation pixel each uniformly between the photoelectric conversion elements.

4. The detection device of claim 1, wherein the detection device offsets the allowable range and then resumes accumulating the joint error quantities after increasing/decreasing the interpolation pixels.

5. The detection device of claim 1, wherein spaces between the specific photoelectric conversion elements where the interpolation pixels are increased/decreased are, of spaces between the photoelectric conversion elements that become accumulation targets of the joint error quantities from after the detection device starts or resumes accumulation to until the joint error quantities exceed the allowable range, spaces between photoelectric conversion elements where an error is largest by itself.

6. An image reading control device comprising:
a detection device including:
a setting component which, in a photoelectric conversion element group that is intended for photoelectric conversion elements where plural photoelectric conversion pixels are arrayed at least in one direction and which has a predetermined reading width as a result of plural photoelectric conversion elements being arrayed in the one direction, sets, as an initial setting and in joints between the photoelectric conversion elements, interpolation pixels that are interpolated by reading information that surrounding photoelectric conversion pixels have read;
a measuring component that measures joint quantities between the photoelectric conversion elements that are dependent on precision when arraying the plural photoelectric conversion elements;
an accumulating component that accumulates error quantities of the joints that are obtained from the joint quantities that have been measured by the joint quantity measuring component and a reference quantity;
a determining component that determines whether or not the accumulated error quantity in the joint error quantity accumulating component has exceeded an allowable range; and
an increasing/decreasing component that increases/decreases, on the basis of a direction of error, interpolation pixels between specific photoelectric conversion elements when it has been determined by the determining component that the accumulated error quantity in the joint error quantity accumulating component has exceeded the allowable range, wherein the image reading control device uses the detection device to detect image information of an image recorded on a planar medium and store or output the detected image information as electric information or magnetic information.

7. The image reading control device of claim 6, wherein the joint quantity measuring component measures the joint quantities between the photoelectric conversion elements on the basis of a difference between reading information of reference images that photoelectric conversion elements adjacent to each other on either sides of the joints have read.

8. The image reading control device of claim 6, wherein the interpolation pixel initial setting component sets, as the initial setting, one interpolation pixel each uniformly between the photoelectric conversion elements.

9. The image reading control device of claim 6, wherein the detection device offsets the allowable range and then resumes accumulating the joint error quantities after increasing/decreasing the interpolation pixels.

10. The image reading control device of claim 6, wherein spaces between the specific photoelectric conversion elements where the interpolation pixels are increased/decreased are, of spaces between the photoelectric conversion elements that become accumulation targets of the joint error quantities from after the detection device starts or resumes accumulation to until the joint error quantities exceed the allowable range, spaces between photoelectric conversion elements where an error is largest by itself.

11. A storage medium readable by a computer, the storage medium storing a program of instructions executable by the computer to perform a function for error correction of a detection device, the function comprising the steps of:
in a photoelectric conversion element group that is intended for photoelectric conversion elements where plural photoelectric conversion pixels are arrayed at least in one direction and which has a predetermined reading width as a result of plural photoelectric conversion elements being arrayed in the one direction, setting, as an initial setting and in joints between the photoelectric conversion elements, interpolation pixels that are interpolated by reading information that surrounding photoelectric conversion pixels have read;
measuring joint quantities between the photoelectric conversion elements that are dependent on precision when arraying the plural photoelectric conversion elements;
accumulating error quantities of the joints that are obtained from the joint quantities that have been measured and a reference quantity;
determining whether or not the accumulated error quantity has exceeded an allowable range; and
increasing/decreasing, on the basis of a direction of error, interpolation pixels between specific photoelectric conversion elements when it has been determined by the determination result that the accumulated error quantity has exceeded the allowable range.

12. The storage medium of claim 11, wherein the function measures the joint quantities between the photoelectric conversion elements on the basis of a difference between reading information of reference images that photoelectric conversion elements adjacent to each other on either sides of the joints have read.

13. The storage medium of claim 11, wherein the function sets, as the initial setting, one interpolation pixel each uniformly between the photoelectric conversion elements.

14. The storage medium of claim 11, wherein the function offsets the allowable range and then resumes accumulating the joint error quantities after increasing/decreasing the interpolation pixels.

15. The storage medium of claim 11, wherein spaces between the specific photoelectric conversion elements where the interpolation pixels are increased/decreased are, of spaces between the photoelectric conversion elements that become accumulation targets of the joint error quantities from after the function starts or resumes accumulation to until the joint error quantities exceed the allowable range, spaces between photoelectric conversion elements where an error is largest by itself.

\* \* \* \* \*